(12) United States Patent
Kenderes (10) Patent No.: US 10,311,755 B2
(45) Date of Patent: Jun. 4, 2019

(54) EYEWEAR FITTING SYSTEM AND METHODS OF USE

(71) Applicant: Rosemary Kenderes, Denver, CO (US)

(72) Inventor: Rosemary Kenderes, Denver, CO (US)

(*) Notice: Subject to any disclaimer, the term of this patent is extended or adjusted under 35 U.S.C. 154(b) by 0 days.

(21) Appl. No.: 15/547,895

(22) PCT Filed: Feb. 2, 2016

(86) PCT No.: PCT/US2016/016089
§ 371 (c)(1),
(2) Date: Aug. 1, 2017

(87) PCT Pub. No.: WO2016/126656
PCT Pub. Date: Aug. 11, 2016

(65) Prior Publication Data
US 2018/0018905 A1    Jan. 18, 2018

Related U.S. Application Data

(60) Provisional application No. 62/110,973, filed on Feb. 2, 2015.

(51) Int. Cl.
*G09B 23/32* (2006.01)
*G09B 19/00* (2006.01)
*G02C 13/00* (2006.01)

(52) U.S. Cl.
CPC .......... *G09B 23/32* (2013.01); *G02C 13/003* (2013.01); *G09B 19/003* (2013.01)

(58) Field of Classification Search
CPC ...... G02C 13/003; G09B 19/00; G09B 23/30; G09B 23/32; A63H 3/365
See application file for complete search history.

(56) References Cited

U.S. PATENT DOCUMENTS

| | | |
|---|---|---|
| 1,868,209 A | 7/1932 | Kapernick |
| 2,831,286 A | 4/1958 | Eisner |
| 4,762,407 A | 8/1988 | Anger et al. |
| 5,090,910 A | 2/1992 | Narlo |
| 2008/0014831 A1* | 1/2008 | Rettberg ............... A63H 3/365 446/301 |
| 2010/0003657 A1 | 1/2010 | Shibui et al. |
| 2011/0087354 A1 | 4/2011 | Tye et al. |
| 2013/0288565 A1 | 10/2013 | McMullen |

* cited by examiner

*Primary Examiner* — Jerry-Daryl Fletcher
(74) *Attorney, Agent, or Firm* — Leyendecker & Lemire, LLC (57) ABSTRACT

An eyewear fitting system and methods of use are described. Embodiments of the eyewear fitting system can include a bust having a plurality of adjustable features. Typically, the adjustable features can include a pair of ears, a pair of eyes, a nose, a pair of cheeks, and a forehead. A user can adjust an individual, several, or all of the adjustable features to practice fitting eyewear frames to differently shaped faces. In one embodiment, a control module can be implemented to randomly alter the adjustable features to a allow student to practice fitting eyewear frames to a variety of differently shaped faces.

8 Claims, 4 Drawing Sheets

EYEWEAR FITTING SYSTEM AND METHODS OF USE

CROSS-REFERENCE TO RELATED APPLICATION

This application claims the benefit of U.S. Provisional Application No. 62/110,973, filed Feb. 2, 2015.

BACKGROUND

Currently, for an optician to learn how to properly fit glasses to a wearer, the optician must practice on live persons. Generally, the optician must practice for several months to gain an understanding of how to properly fit eyewear to a variety of different head shapes and faces. For instance, an optician must work with a wide variety of live persons to get practice on a variety of different face shapes. As such, the optician does not currently have means of practicing on different faces unless they have a plurality of friends or family who will sit through hours of training with them to provide the variety of face shapes.

Therefore, there is a need for a system that includes a bust having one or more adjustable features for creating differently shaped faces to allow a user to practice fitting eyewear to countless variations of human faces.

DETAILED DESCRIPTION

Embodiments of the present invention include an eyewear fitting system and methods of use. Typically, the eyewear fitting system can include a bust of a human head having a plurality of adjustable facial features. In one embodiment, the adjustable facial features can include, but are not limited to, a pair of eyes, a nose, a pair of ears, a pair of cheeks, and a forehead. For instance, the adjustable features can adjust (i) a width between eyes or eye location, (ii) eye depth, (iii) nose size, (iv) a width of a bridge of the nose, (v) forehead location, (vi) forehead depth, (vii) a location of the cheeks, (viii) a depth of the cheeks, (ix) a location of the ears, (x) a location and size of a mastoid, (xi) a width of a temple, etc.

Typically, each of the facial features can be adjusted to allow for countless variations of the bust. In some embodiments, the facial features can be adjusted by mechanical mechanisms controlled by a user. For instance, each of the facial features can include an adjustment mechanism adapted to adjust the facial feature. As an example, the bridge of the nose of the head bust can be narrowed and widened by a mechanical mechanism. As such, a user can practice fitting eyewear to differently shaped noses.

In one embodiment, the adjustable facial features can be controlled by a computer program. In such an embodiment, the adjustable facial features can be programmed by a connected computing device or user device. For instance, the computing device can include a program that outlays parameters for a user to choose for each of the adjustable features. Generally, the bust can include a control module for receiving the parameters and sending signals to the adjustment mechanisms to adjust the adjustable features appropriately. The program can also include a random setting where the adjustable features are randomly selected to allow an optician to practice on a variety of different face shapes. Once a user adjusts the parameters for each adjustable feature, the computer can communicate with the head bust to make the adjustments. For instance, the computing device can be wirelessly connected to the head bust.

Embodiments of the invention are contemplated wherein each of the adjustable facial features can include one or more pressure sensors. The pressure sensors can be calibrated to indicate when a certain facial feature is being pressed on too hard by an eyewear frame. For instance, the bridge of the nose can include a pressure sensor to help teach an optician a proper fit of the eyewear on a bridge of a nose. In some embodiments, the pressure sensors can include means of visually displaying if the pressure is within a prescribed range. For instance, the pressure sensors may include LEDs. Typically, a red LED and a green LED can be implemented to visually indicate to a user whether or not the pressure being applied to the sensor is within a proscribed acceptable range. When the pressure is within the proscribed range, the green LED can be activated. If the pressure is outside the proscribed range, then the red LED can be activated.

Embodiments are contemplated where a user can be given a score based on the pressure sensor readings. For instance, points can be awarded based on being within a proscribed acceptable range, and points can be deducted for each pressure sensor that is out of the proscribed acceptable range.

Embodiments are contemplated wherein an eyewear manufacturer can implement the eyewear fitting system to pre-fit a pair of eyeglasses to the bust based on facial specifications received from a user. In one example, a user can submit pictures including a view of a front of their face and a view of either side of their face. The manufacturer can implement well known facial mapping technology to generate a plurality of data for adjusting the adjustable facial features of the bust to mirror a face of the user. The manufacturer can then pre-fit a pair of eyewear frames to the bust to approximately fit the pair of eyewear frames for the user before sending the eyewear frames to the user.

It is to be appreciated that embodiments of the present invention can be implemented in training scenarios where one or more opticians train with the head busts. Various training regimens and courses are contemplated to help an optician learn to fit eyewear frames to a variety of differently shaped faces.

The present invention can be embodied as devices, systems, methods, and/or computer program products. Accordingly, the present invention can be embodied in hardware and/or in software (including firmware, resident software, micro-code, etc.). Furthermore, the present invention can take the form of a computer program product on a computer-usable or computer-readable storage medium having computer-usable or computer-readable program code embodied in the medium for use by or in connection with an instruction execution system. In one embodiment, the present invention can be embodied as non-transitory computer-readable media. In the context of this document, a computer-usable or computer-readable medium can include, but is not limited to, any medium that can contain, store, communicate, propagate, or transport the program for use by or in connection with the instruction execution system, apparatus, or device.

It is to be appreciated that the computer-usable or computer-readable medium can be, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), an erasable programmable read-only memory (EPROM or Flash memory), an optical fiber, a portable compact disc read only memory (CD-ROM), and a digital video disk read only memory (DVD-ROM). Note that the computer-usable or computer-readable medium could even be paper or another suitable medium upon which the program is printed, as the program can be electronically captured, via, for instance, optical scanning of the paper or other medium, then compiled, interpreted, of otherwise professed in a suitable manner, if necessary, and then stored in a computer memory.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

The terms "face" and "faces," as used in this specification and the appended claims, refers generally to a front half portion of a human head including, but not limited to, the eyes, the nose, the cheeks, the forehead, the ears, behind the ears, the temples, the mouth, and the chin.

The term "software," as used in this specification and the appended claims, refers to programs, procedures, rules, instructions, and any associated documentation pertaining to the operation of a system.

The term "firmware," as used in this specification and the appended claims, refers to computer programs, procedures, rules, instructions, and any associated documentation contained permanently in a hardware device and can also be flashware.

The term "hardware," as used in this specification and the appended claims, refers to the physical, electrical, and mechanical parts of a system.

The terms "computer-usable medium" or "computer-readable medium," as used in this specification and the appended claims, refers to any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

The term "signal," as used in this specification and the appended claims, refers to a signal that has one or more of its characteristics set or changed in such a manner as to encode information in the signal. It is to be appreciated that wireless means of sending signals can be implemented including, but not limited to, Bluetooth, Wi-Fi, acoustic, RF, infrared and other wireless means.

A First Embodiment of an Eyewear Fitting System

Figure 1:
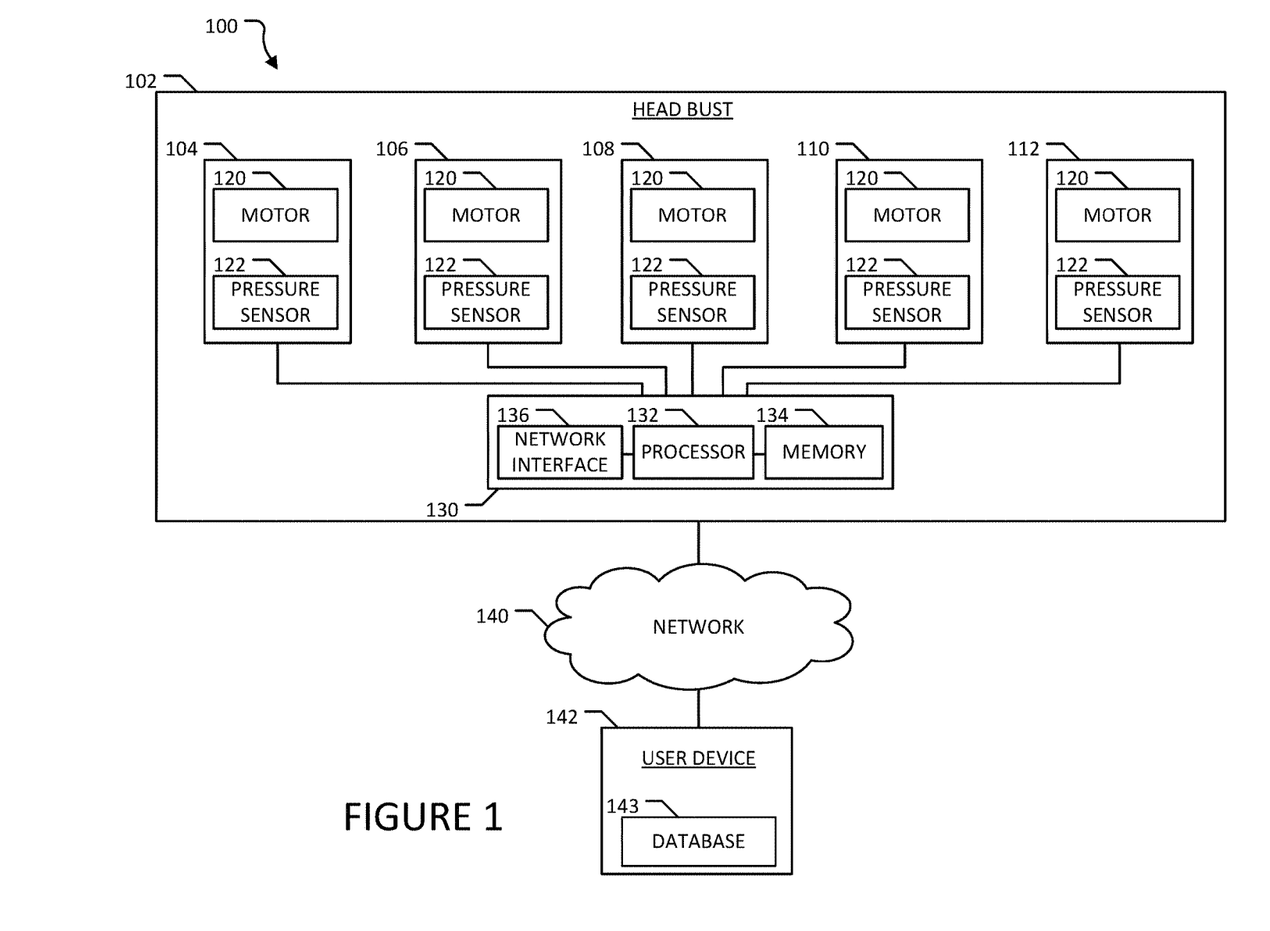
FIG. 1 is a block diagram of an eyewear fitting system according to one embodiment of the present invention.

Referring to FIG. 1, a block diagram of an embodiment 100 showing an eyewear fitting system is illustrated. Generally, the eyewear fitting system 100 can include a bust shaped like a human head having one or more adjustable facial features and a user device for adjusting the one or more adjustable facial features. In one instance, the system 100 can be implemented to teach opticians how to properly fit eyewear frames to a variety of differently shaped faces.

As shown in FIG. 1, the eyewear fitting system 100 can include a bust 102 having a plurality of adjustable features 104-112, a network 140, and a user device 142.

Typically, a pair of eyes, a nose, a pair of cheeks, a forehead, and a pair of ears of the bust 102 can each be adjustable. It is to be appreciated that more or less facial features are contemplated to be adjustable with the head bust. For instance, one embodiment may include adjustable ears and an adjustable nose while another embodiment includes adjustable ears, an adjustable nose, and an adjustable forehead.

In one embodiment, the bust 102 can include, but is not limited to, a first adjustable feature 104, a second adjustable feature 106, a third adjustable feature 108, a fourth adjustable feature 110, a fifth adjustable feature 112, and a control module 130. The first adjustable feature 104 can be a pair of eyes, the second adjustable feature 106 can be a nose, the third adjustable feature 108 can be a pair of ears, the fourth adjustable feature 110 can be a pair of cheeks, and the fifth adjustable feature 112 can be a forehead.

As shown in FIG. 1, each of the adjustable features 104-112 can include an adjustment mechanism 120 and one or more sensors 122. Typically, each of the adjustable facial features 104-112 can be coupled to the adjustment mechanisms.

In one embodiment, each of the adjustment mechanisms 120 can be electric motors connected to the control module 130. The control module 130 can be adapted to send signals to the electric motors to alter the adjustable facial features 104-112 when needed. It is to be appreciated that the adjustment mechanisms can include adjustment means well known to one of ordinary skill in the art.

In another embodiment, the adjustment mechanisms can be mechanical adjustment means including, but not limited to, one or more pneumatic pumps adapted to move each of the adjustable facial features 104-112. In such an embodiment, there may be individual pneumatic pumps for each adjustable facial feature 104-112 that can be altered manually by a user. As such, the user can adjust each of the adjustable facial features 104-112 individually. In another instance, the mechanical adjustment means can include ballasts adapted to adjust the adjustable facial features by being inflated and deflated. It is to be appreciated that a plurality of different mechanical adjustment means are contemplated.

In one embodiment, the sensors 122 can be pressure sensors that are able to detect variations in pressure applied to an adjustable feature. In some embodiments, the head bust can include one or more pressure sensors 122 for each of the adjustable facial features 104-112. The pressure sensors 122 can generally be located approximate areas where eyewear can be in contact with a wearer's head. For example, there could be pressure sensors 122 located on an upper part of each of the cheeks 110, on a bridge of the nose 106, and on each of the ears 108. Typically, the pressure sensors 122 can be calibrated to a range of acceptable pressure and be adapted to send a signal via the control module 130 to the user device 142 when the pressure sensor 122 determines the pressure is too high.

The control module 130 can typically include, but is not limited to, a processor 132, a memory 134, and a network interface 136. The processor 132 can be a single core microprocessor, a multi-core processor, or a group of processors. The memory 134 can typically include random access memory (RAM) and/or a nonvolatile storage. Generally, the RAM can store executable code as well as data that can be immediately accessible to the processor 132. The nonvolatile storage can be adapted store executable code and data in a persistent state. The network interface 136 can include, but is not limited to, hardwired and wireless interfaces through which the control module 130 can communicate with other devices including, but not limited to, smartphones, tablets, laptops, notebooks, desktops, and other computing devices.

The network 140 can be any type of network, such as a local area network, wide area network, or the Internet. In some cases, the network 140 can include wired or wireless connections and may transmit and receive information using various protocols.

The user device 142 can be any type of computing device on which an application and/or program can operate. Examples of such devices can include, but are not limited to, desktop computers, laptop computers, tablet computers, mobile telephones, game consoles, network appliances, or any other web-enabled devices. In an embodiment, the user device 142 can have various hardware platforms on which an application can execute. In one instance, the system can execute functional operations by virtue of service calls to a service-based processing system.

Typically, the user device 142 can include at least one database 143 which can store a plurality of adjustment parameters for each of the adjustable facial features 104-112. The user device 142 can generally include an operating system on which various applications can execute. In one embodiment, the user device 142 can include a facial feature adjustment program described in more detail hereinafter. Generally, the facial feature adjustment program can be implemented as an application on the user device 142 or any device connected to the control module 130 of the bust 102. As can be appreciated, the facial feature adjustment program can be implemented to send signals from the user device 142 to the control module 130 to adjust the adjustable facial features 104-112 of the bust 102.

In one embodiment, the facial feature adjustment program can be implemented to control adjustments to the adjustable facial features 104-112. Typically, the program can include a plurality of settings for each of the adjustable facial features. For instance, for the pair of eyes 104, the program can include controls or settings for moving the eyes closer and further apart. In some embodiments, a depth of the pair of eyes 104 can be adjusted. Typically, the program will allow a user to individually adjust each of the adjustable facial features 104-112. In some instances, the program can include an auto-adjust feature where the adjustable facial features 104-112 will each be randomly adjusted.

As can be appreciated, the facial feature adjustment program can be implemented to adjust each of the adjustable facial features 104-112 included with the bust 102. In a typical implementation, the facial feature adjustment program can be implemented to individually adjust each of the adjustable facial features 104-112 via the user device 142. For instance, a signal can be sent from the user device 142 to the bust 102 and the control module 130 can activate one or more of the motors 120 to adjust a facial feature based on the signal. As such, a user can implement the program and adjust each of the features to create a new face to practice fitting eyewear frames to. In some embodiments, the program can include a randomizing mode, wherein each of the facial features is randomized to provide a random face to practice fitting eyewear frames to.

Figure 2A:
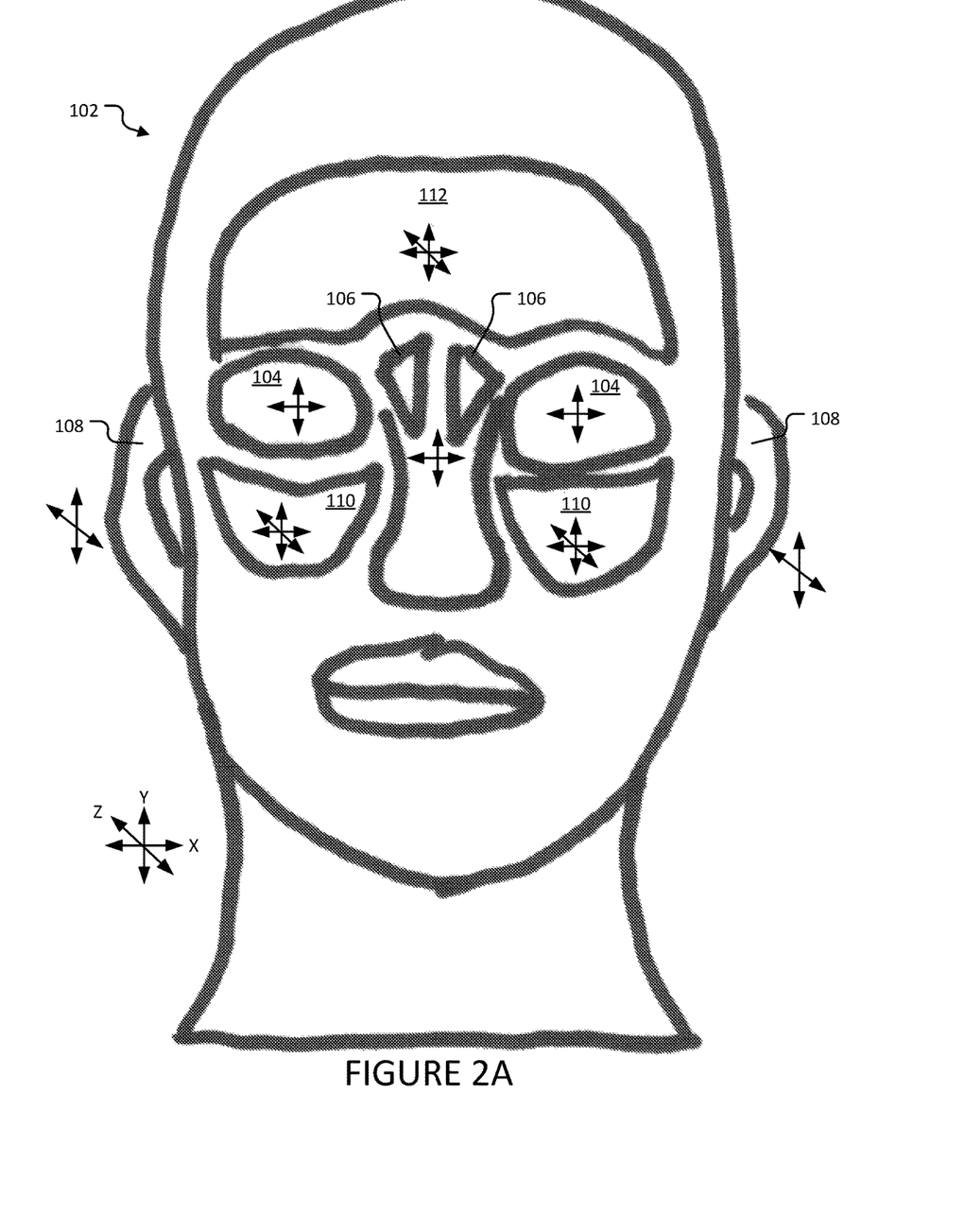
FIG. 2A is a front view of a bust including adjustable features according to one embodiment of the present invention.
Figure 2B:
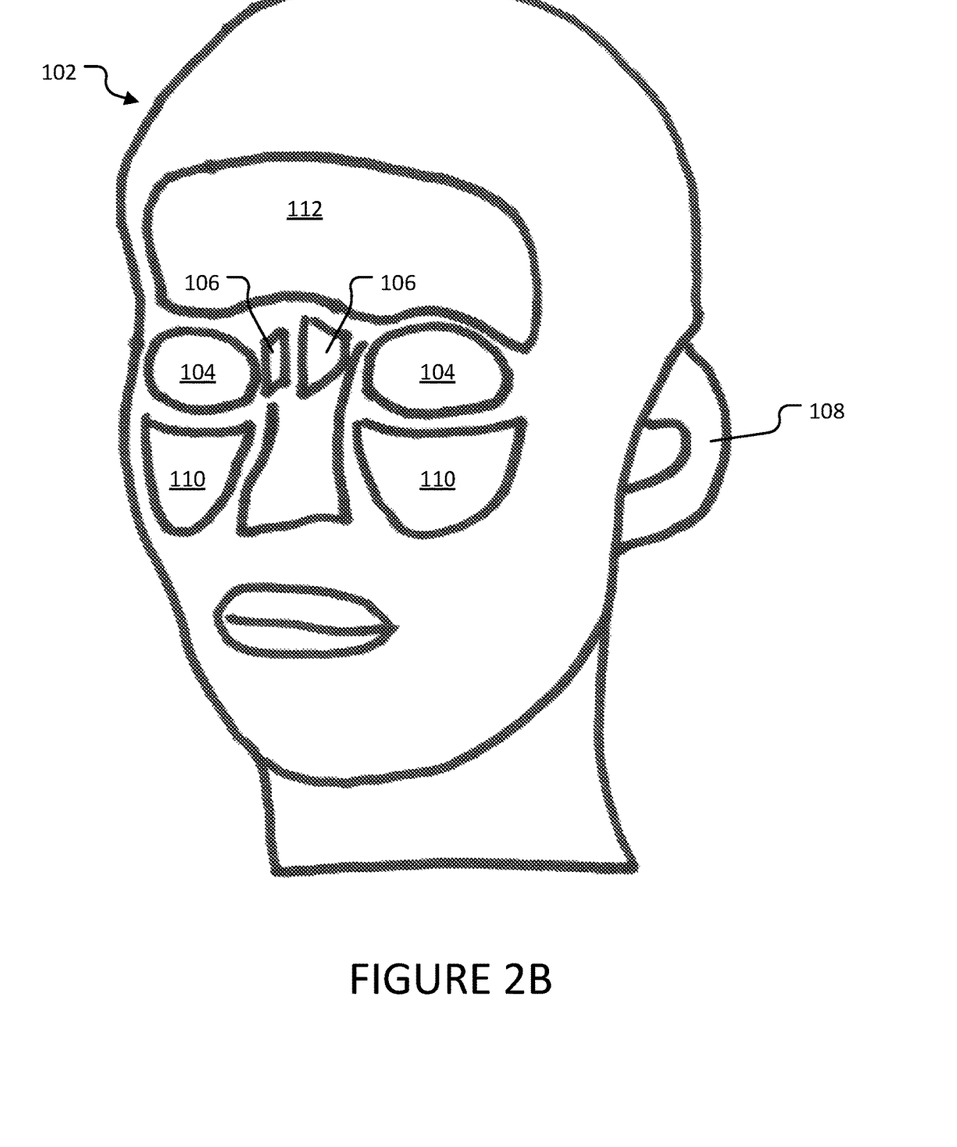
FIG. 2B is a perspective view of a bust including adjustable features according to one embodiment of the present invention.
Figure 2C:
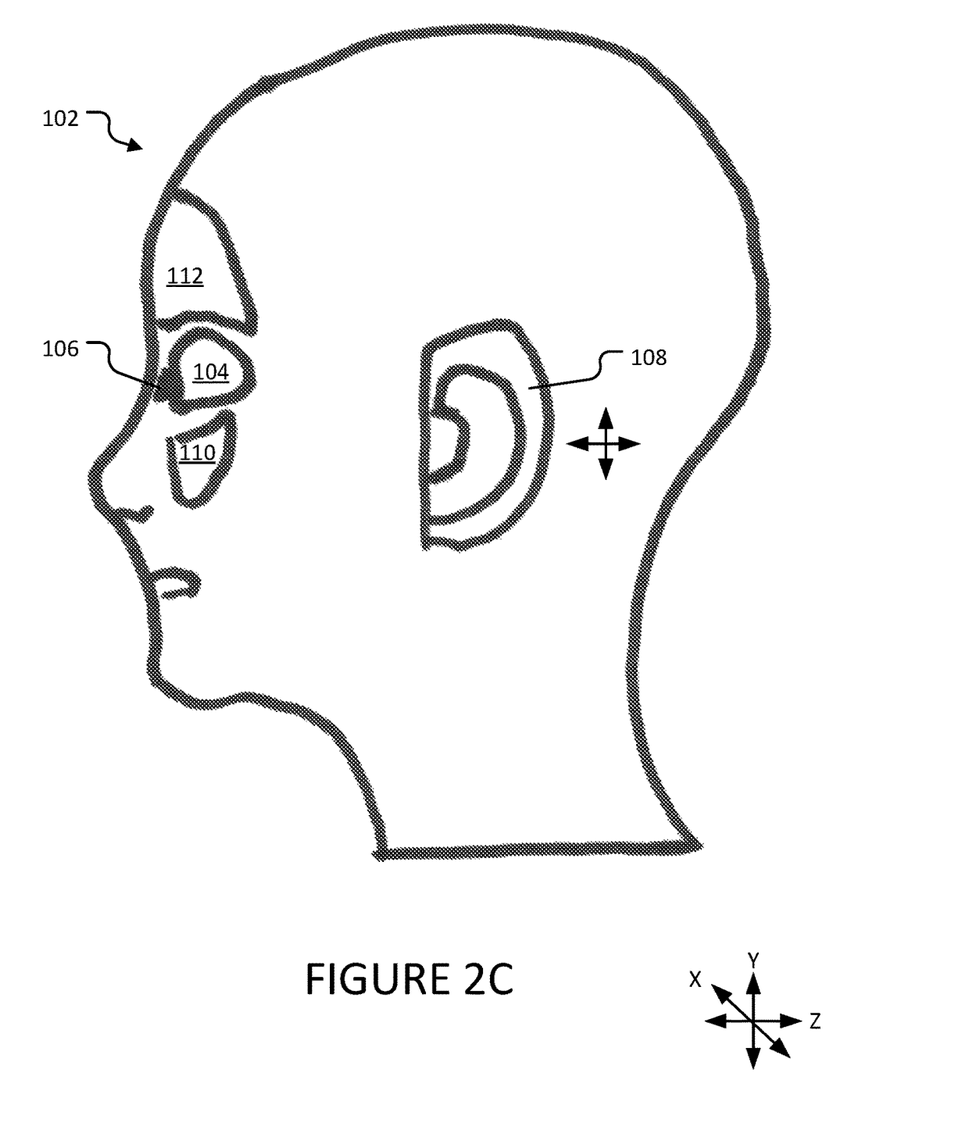
FIG. 2C is a side view of a bust including adjustable features according to one embodiment of the present invention.

Referring to FIGS. 2A-2C, detailed diagrams of one embodiment of the bust 102 are illustrated. As shown, the bust 102 can include the plurality of adjustable facial features relating to a pair of eyes, a nose, a pair of ears, a pair of cheeks, and a forehead.

Generally, the pair of eyes 104 can be moved laterally to widen or narrow a distance between the pair of eyes 104. In one instance, a bridge of the nose 106 can be adapted to move in and out and up and down. The pair of ears 108 can typically be adapted to be moved up and down and forward and back. The pair of cheeks 110 can be moved up and down and in and out to change a depth of the cheeks 110. The forehead 112 can typically be adapted to be moved in and out to adjust a depth of the forehead 112.

The arrows presented in FIGS. 2A-2C show how each of the adjustable facial features 104-112 can be adjusted. As shown in FIG. 2A, the x-axis is horizontal or side to side, the y-axis is vertical or up and down, and the z-axis is in or out. In one embodiment, the pair of eyes 104 can be moved up and down and side to side. In another embodiment, each of the pair of cheeks 110 can be adjusted up and down, side to side, and a depth of the cheeks can also be adjusted. It is to be appreciated that various embodiments of the present invention can include one or more adjustments for each of the adjustable facial features 104-112. For instance, one embodiment may include a pair of eyes that are only adjustable from side to side.

As shown in FIG. 2C, the x-axis is coming out or back into the figure, the y-axis is vertical or up and down, and the z-axis is horizontal or side to side. As shown, the pair of ears 104 can be moved up and down and side to side when viewed from the side.

As can be appreciated, each of the adjustable facial features 104-112 can be altered to vary a configuration of the bust 102.

A First Method of Using an Eyewear Fitting System

In a typical implementation, a user can practice fitting eyewear frames to the bust 102. For instance, an optician can implement the eyewear fitting system 100 to practice fitting frames to differently shaped faces. Generally, the optician can become proficient in fitting eyewear frames by practicing fitting eyewear frames to the bust 102.

In a first step, a user can adjust one or more of the adjustable features 104-112 to create a first face on the bust 102. For instance, the user can adjust a width between the pair of eyes 104 and broaden a bridge of the nose 106. It is to be appreciated that the user can adjust one, several, or all of the adjustable features 104-112 to create the first face.

In a second step, the user can practice fitting a pair of eyewear frames to the first face. The user can also practice fitting differently shaped frames to the first face.

In a third step, the user can adjust one or more of the adjustable features 104-112 to create a second face on the bust 102. For instance, the user can adjust a location of the pair of eyes 104, a location of the pair of ears 108, and a location of the pair of cheeks 110.

In a fourth step, the user can practice fitting the pair of eyewear frames to the second face. The user can also practice fitting differently shaped frames to the second face.

As can be appreciated, the user can repeatedly change one or more of the adjustable facial features 104-112 of the bust 102 and continuously practice fitting eyewear frames to the varying faces.

In some instances, the user can have another person alter the adjustable facial features 104-112 of the bust 102 for a test to determine how well the user is fitting eyewear frames to the bust 102.

A Second Method of Using an Eyewear Fitting System

In a second implementation of the eyewear fitting system 100, a school of optometry or similar school can use the eyewear fitting system 100 to train and test students. For instance, a school can implement the eyewear fitting system 100 to test students on fitting eyewear frames to randomly set faces.

In a first step, the school can provide the eyewear fitting system 100 for a student to use.

In a second step, the student can practice fitting eyewear frames to the bust 102. Generally, the student can alter the adjustable facial features 104-112 to practice fitting eyewear frames to differently shaped faces.

In a third step, the school can use the eyewear fitting system 100 to test students on how well they are fitting frames to a face. Typically, in such an embodiment, the bust 102 can include the pressure sensors 122 to help determine how well a student is fitting a pair of frames to the bust 102. As can be appreciated, the school can implement a variety of different testing techniques. For example, the school may have five preset faces for the bust 102 on which all students are tested on. The school could then use the pressure sensors 122 along with a teacher's observation to score how well the student did for each of the faces.

A Third Method of Using an Eyewear Fitting System

In a third implementation of the eyewear fitting system 100, an eyewear manufacturer or seller can use the eyewear fitting system 100 to fit frames to the bust 102 having substantially similar facial features to a face of a buyer who purchases frames from the manufacturer or seller.

In a first step, a buyer can upload images of their face to a website of the manufacturer/seller. Generally, a front shot and two side shots can be uploaded to the website.

In a second step, the manufacturer/seller can implement well known facial recognition technology to take several different measurements of the buyer's face. Generally, several different measurements can be taken from the images. For instance, a distance between the buyer's eyes can be measured, a width of the buyer's nose can be measured, a location of the buyer's ears in relation to the buyer's eyes can be measured, a location of the buyer's cheeks can be measured, and a depth of the buyer's forehead in relation to the buyer's eyes can be measured. It is to be appreciated that metrics not mentioned are contemplated to further match a buyer's face with the adjustable facial features 104-112 of the bust 102. For instance, technology disclosed in U.S. Pat. No. 6,692,127, granted on Feb. 17, 2004, US Publication 2014/0293220, published on Oct. 2, 2014, and US Publication 2013/0088490, published on Apr. 11, 2013 can be implemented to generate data for matching the adjustable facial features 104-112 of the bust 102 to facial features measured from the uploaded images. The previously mentioned patents and patent publications are each hereby incorporated by reference in their entirety.

In a third step, after measurements have been taken from the buyer's face, the manufacturer/seller can load the measurements into a software program. The software program can be adapted to take the measurements and communicate with the control module 130 to adjust the adjustable facial features 104-112 of the bust 102 to match the buyer's measurements. Generally, the bust 102 can then be altered to match the adjustable facial features 104-112 of the bust 102 to measurements of the buyer's face.

In a fourth step, after the bust 102 has been altered with the measurements from the buyer's face, a worker for the manufacturer/seller can fit eyewear frames selected by the buyer to the bust 102. Since the bust 102 will be updated to have substantially corresponding facial features as the buyer, the manufacturer/seller can pre-fit frames for the buyer before shipping the eyewear frames to the buyer.

In a fifth step, the manufacturer/seller can send the pre-fit eyewear frames to the buyer. As can be appreciated, the buyer can receive pre-fit eyewear frames. The buyer would not then need to go in to see an optician to have the frames adjusted for their face.

In some embodiments, the previously mentioned method can include taking measurements from the buyer's uploaded photos to have bi-focal frames fit to the buyer. Generally, measurements typically used to fit bi-focal frames to a wearer can be taken from photos of a buyer. The measurements can then be sent to the control module 130, whereby the control module 130 can alter the adjustable features 104-112 of the bust 102 to match the buyer's face. A trained optician can then fit the bi-focal frames to the buyers head via the bust 102.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A method for practicing fitting eyewear frames to a face, the method comprising:
   providing a bust of a human head, the bust including:
      a pair of eyes, wherein a location of the eyes is adjustable;
      a pair of ears, wherein a location of the pair of ears is adjustable;
      a forehead, wherein a depth of the forehead is adjustable;
      a nose, wherein a width of the nose is adjustable; and
      a pair of cheeks, wherein a location of the pair of cheeks and a depth of the pair of cheeks are adjustable;
   adjusting at least one of the pair of eyes, the pair of ears, the forehead, the nose, and the pair of cheeks; and
   fitting an eyewear frame to the bust.

2. The method of claim 1, further comprising the steps of:
   altering the bust by adjusting at least another one of the pair of eyes, the pair of ears, the forehead, the nose, and the pair of cheeks; and
   fitting the eyewear frame to the altered bust.

3. A method for practicing fitting eyewear frames to a face, the method comprising:
   providing a bust of a human head, the bust including:
      a pair of eyes, wherein a location of the eyes is adjustable;
      a pair of ears, wherein a location of the pair of ears is adjustable;
      a forehead, wherein a depth of the forehead is adjustable;
      a nose, wherein a width of the nose is adjustable;
      a pair of cheeks, wherein a location of the pair of cheeks and a depth of the pair of cheeks are adjustable; and
      a mechanical adjustment member for (i) the pair of eyes, (ii), the pair of ears, (iii) the forehead, (iv) the nose, and (v) the pair of cheeks;
   adjusting one of the pair of eyes, the pair of ears, the forehead, and the pair of cheeks; and
   fitting an eyewear frame to the bust.

4. A bust for fitting eyewear frames to, the bust comprising:
   a pair of eyes, a location of the pair of eyes being adjustable;
   a pair of ears, a location of the pair of ears being adjustable;
   a forehead, a depth of the forehead being adjustable;
   a nose, a width of the nose being adjustable;
   a pair of cheeks, a location of the pair of cheeks and a depth of the pair of cheeks being adjustable;
   a first adjustment mechanism for adjusting the location of the pair of eyes;
   a second adjustment mechanism for adjusting the location of the pair of ears;
   a third adjustment mechanism for adjusting the depth of the forehead;
   a fourth adjustment mechanism for adjusting the width of the nose; and
   a fifth adjustment mechanism for adjusting the location and the depth of the pair of cheeks.

5. A method for practicing fitting eyewear frames to a face, the method comprising:
   providing a bust of a human head, the bust including:
      a pair of eyes, a location of the pair of eyes being adjustable;
      a pair of ears, a location of the pair of ears being adjustable;
      a forehead, a depth of the forehead being adjustable;
      a nose, a width of the nose being adjustable;
      a pair of cheeks, a location of the pair of cheeks and a depth of the pair of cheeks being adjustable;
      a first adjustment mechanism for adjusting the location of the pair of eyes;
      a second adjustment mechanism for adjusting the location of the pair of ears;
      a third adjustment mechanism for adjusting the depth of the forehead;
      a fourth adjustment mechanism for adjusting the width of the nose; and
      a fifth adjustment mechanism for adjusting the location and the depth of the pair of cheeks;
   adjusting at least one of the pair of eyes, the pair of ears, the forehead, the nose, and the pair of cheeks; and
   fitting an eyewear frame to the bust.

6. A system for practicing fitting eyewear frames, the system comprising:
   a bust of a human head, the bust including:
      a pair of eyes, a location of the pair of eyes being adjustable;
      a pair of ears, a location of the pair of ears being adjustable;
      a forehead, a depth of the forehead being adjustable;
      a nose, a width of the nose being adjustable;
      a pair of cheeks, a location of the pair of cheeks and a depth of the pair of cheeks being adjustable;
      a first adjustment mechanism for adjusting the location of the pair of eyes;
      a second adjustment mechanism for adjusting the location of the pair of ears;
      a third adjustment mechanism for adjusting the depth of the forehead;
      a fourth adjustment mechanism for adjusting the width of the nose;
      a fifth adjustment mechanism for adjusting the location and the depth of the pair of cheeks; and
      a control module operatively coupled to the first adjustment mechanism, the second adjustment mechanism, the third adjustment mechanism, the fourth adjustment mechanism, and the fifth adjustment mechanism;
   a device remotely connected to the control module of the bust, the device adapted to send signals to the control module to cause (i) the first adjustment mechanism to adjust the location of the pair of eyes, (ii) the second adjustment mechanism to adjust the location of the pair of ears, (iii) the third adjustment mechanism to adjust a depth of the forehead, (iv) a fourth adjustment mechanism to adjust the width of the nose, and (v) a fifth adjustment mechanism to adjust the location and the depth of the pair of cheeks.

7. An apparatus for practicing fitting eyewear frames to, the apparatus comprising:
   a bust of a human head, the bust including:
      a pair of eyes, wherein a location of the eyes is adjustable;
      a pair of ears, wherein a location of the pair of ears is adjustable;

a forehead, wherein a depth of the forehead is adjustable;

a nose, wherein a width of the nose is adjustable;

a pair of cheeks, wherein a location of the pair of cheeks and a depth of the pair of cheeks are adjustable; and a mechanical adjustment member for (i) the pair of eyes, (ii), the pair of ears, (iii) the forehead, (iv) the nose, and (v) the pair of cheeks.

8. The apparatus of claim 7, wherein the mechanical adjustment members are adapted to be manually altered.

* * * * *